(12) United States Patent
Xie et al.

(10) Patent No.: US 11,025,168 B2
(45) Date of Patent: Jun. 1, 2021

(54) HIGH EFFICIENCY FLEXIBLE CONVERTER

(71) Applicant: SCHNEIDER ELECTRIC IT CORPORATION, West Kingston, RI (US)

(72) Inventors: Jingwen Xie, Shanghai (CN); Tongfei Zhang, Shanghai (CN); Chenlei Bao, Shanghai (CN); Puyang Cheng, Shanghai (CN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/535,593

(22) Filed: Aug. 8, 2019

(65) Prior Publication Data

US 2020/0052596 A1     Feb. 13, 2020

(30) Foreign Application Priority Data

Aug. 9, 2018    (CN) .......................... 201810902712.0

(51) Int. Cl.

| H02J 9/06 | (2006.01) |
|---|---|
| H02M 1/42 | (2007.01) |
| H02M 3/315 | (2006.01) |

(52) U.S. Cl.
CPC ........... *H02M 3/3155* (2013.01); *H02J 9/061* (2013.01); *H02M 1/42* (2013.01)

(58) Field of Classification Search
CPC ...... H02M 3/3155; H02M 1/42; H02M 7/487; H02M 7/483; H02J 9/061; H02J 9/062

(Continued)

(56) References Cited

U.S. PATENT DOCUMENTS

| 2012/0181871 A1 | 7/2012 | Johansen et al. | |
|---|---|---|---|
| 2015/0288222 A1* | 10/2015 | Bergman | H02J 9/06 307/64 |
| 2016/0006295 A1* | 1/2016 | Yang | H02J 7/34 307/66 |

FOREIGN PATENT DOCUMENTS

| EP | 2899836 A1 | 7/2015 |
|---|---|---|
| JP | 2013230027 A | 11/2013 |
| JP | 2015107018 A | 6/2015 |

OTHER PUBLICATIONS

Extended European Search Report from corresponding Euorpean Application No. 19189765.1 dated Jan. 7, 2020.

(Continued)

*Primary Examiner* — Rexford N Barnie
*Assistant Examiner* — Xuan Ly
(74) *Attorney, Agent, or Firm* — Lando & Anastasi, LLP

(57) ABSTRACT

According to one aspect, a UPS system is provided including an input configured to receive AC input power, an output configured to provide AC output power to a load, a rectifier coupled to the input, an inverter coupled to the rectifier and the output, an auxiliary branch coupled to the input and the output, and a controller coupled to the rectifier, the inverter, and the auxiliary branch, and configured to receive voltage information indicative of a voltage level of the AC input power and AC output power, select, based on the voltage information satisfying a first condition, a buck mode of operation, select, based on the voltage information satisfying a second condition, a freewheel mode of operation, and communicate one or more control signals to at least one of the rectifier, the inverter, and the auxiliary branch based on the selected mode of operation.

20 Claims, 12 Drawing Sheets

(58) Field of Classification Search
USPC .......................................................... 307/66
See application file for complete search history.

(56) References Cited

OTHER PUBLICATIONS

Giuntini Lorenzo et al:, "Double-conversion UPS efficiency under varying mains conditions", 2013 15th European Conference on Power Electronics and Applications (EPE), IEEE, Sep. 2, 2013 (Sep. 2, 2013), pp. 1-9, XP032505526, Doi: 10.1109/EPE.2013.6631768 [retrieved on Oct. 14, 2013].

\* cited by examiner

HIGH EFFICIENCY FLEXIBLE CONVERTER

RELATED APPLICATIONS

This application claims the benefit under 35 U.S.C. § 119 of Chinese Patent Application No. 201810902712.0 filed on Aug. 9, 2018 which is hereby incorporated herein by reference in its entirety for all purposes.

BACKGROUND OF INVENTION

1. Field of Invention

The present invention relates generally to systems and methods for providing high-efficiency power conversion.

2. Discussion of Related Art

The use of power devices, such as Uninterruptible Power Supplies (UPS), to provide regulated, uninterrupted power for sensitive and/or critical loads, such as computer systems and other data processing systems, is known. Known uninterruptible power supplies include online UPS s, offline UPS s, line-interactive UPS s, as well as others. Online UPS s provide conditioned AC power as well as back-up AC power upon interruption of a primary source of AC power. Offline UPSs typically do not provide conditioning of input AC power, but do provide back-up AC power upon interruption of the primary AC power source. Line-interactive UPSs are similar to offline UPSs in that they switch to battery power when a blackout occurs but also typically include a multi-tap transformer for regulating the output voltage provided by the UPS.

A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, a DC-AC inverter generates an AC output voltage to the load. Since the DC bus is powered either by mains or the battery, the output power of the UPS is uninterrupted if the mains fails and the battery is sufficiently charged. A conventional offline UPS normally connects a load directly to utility power. When utility power is insufficient to power the load, the offline UPS operates a DC-AC inverter to convert DC power from a backup power source (e.g., a battery) into desired AC power, which is provided to the load. Each of the foregoing types of UPS may be implemented in connection with a power modulation stage, which may include a power converter module and a power inverter module.

SUMMARY OF INVENTION

At least one aspect of the disclosure is directed to an Uninterruptible Power Supply (UPS) system including an input configured to receive AC input power, an output configured to provide AC output power to at least one load, a rectifier coupled to the input, an inverter coupled to the rectifier at a first connection, and coupled to the output at a second connection, an auxiliary branch coupled to the input at a first connection, and coupled to the output at a second connection, and a controller coupled to the rectifier, the inverter, and the auxiliary branch, and configured to: receive input voltage information indicative of a voltage level of the AC input power, receive output voltage information indicative of a voltage level of the AC output power, select, based on the input voltage information and the output voltage information satisfying a first condition, a buck mode of operation, select, based on the input voltage information and the output voltage information satisfying a second condition, a freewheel mode of operation, and communicate one or more control signals to at least one of the rectifier, the inverter, and the auxiliary branch based on the selected mode of operation.

In one embodiment, the auxiliary branch includes one or more auxiliary switches, the rectifier includes one or more rectification switches, and the inverter includes one or more main branch switches and one or more freewheeling switches. In some embodiments, satisfying the first condition includes determining that the voltage level of the AC input power is greater than the voltage level of the AC output power. In an embodiment, the controller is configured, responsive to the first condition being satisfied, to: operate the one or more auxiliary switches to conduct the AC input power to at least one of the output and the inverter, and operate the one or more freewheeling switches to buck the AC input power.

In one embodiment, satisfying the second condition includes determining that the voltage level of the AC input power is less than the voltage level of the AC output power. In at least one embodiment, the output includes an output inductor, and wherein the controller is configured, responsive to the second condition being satisfied, to: operate the one or more main branch switches to generate the AC output power and provide the AC output power to the output, and operate the one or more auxiliary switches to freewheel during flyback of the output inductor. In one embodiment, the controller is further configured to select, based on the input voltage information and the output voltage information, one of a connection mode of operation and a stop mode of operation.

In some embodiments, the controller is configured to select the connection mode of operation responsive to determining that the voltage level of the AC input power is approximately equal to the voltage level of the AC output power. In one embodiment, the controller is configured to determine that the voltage level of the AC input power is approximately equal to the voltage level of the AC output power responsive to determining that the voltage level of the AC input power is within a threshold range of the voltage level of the AC output power.

In an embodiment, the controller is configured, responsive to selecting the connection mode of operation, to: disable the rectifier and the inverter from providing power, and operate the one or more auxiliary switches to provide the AC input power to the output. In one embodiment, the controller is configured to select the stop mode of operation responsive to determining that a polarity of the voltage level of the AC input power is opposite a polarity of the voltage level of the AC output power.

In some embodiments, the controller is configured, responsive to selecting the stop mode of operation, to: disable the auxiliary switches from providing the AC input power to the output, and operate the one or more rectification switches, the one or more main branch switches, and the one or more freewheeling switches to provide the AC output power to the output.

According to one aspect of the disclosure, a method of conditioning AC input power received from an input with one or more of a rectifier, an inverter, and an auxiliary branch to provide AC output power to an output is provided, the method comprising: receiving input voltage information indicative of a voltage level of the AC input power, receiving output voltage information indicative of a voltage level of the AC output power, selecting, based on a determination that the input voltage information and the output voltage information satisfy a first condition at a first time, a buck mode of operation, selecting, based on a determination that the input voltage information and the output voltage information satisfy a second condition at a second time, a freewheel mode of operation, and communicating one or more control signals to at least one of the rectifier, the inverter, and the auxiliary branch based on the selected mode of operation.

In one embodiment, determining that the input voltage information and the output voltage information satisfy the first condition includes determining that the voltage level of the AC input power is greater than the voltage level of the AC output power. In some embodiments, the method further includes operating, responsive to selecting the buck mode of operation, the auxiliary branch to conduct the AC input power to at least one of the output and the inverter, and operating, responsive to selecting the buck mode of operation, the inverter to buck the AC input power.

In an embodiment, determining that the input voltage information and the output voltage information satisfy the second condition includes determining that the voltage level of the AC input power is less than the voltage level of the AC output power. In some embodiments, the method further includes operating, responsive to selecting the freewheel mode of operation, the inverter to generate the AC output power and provide the AC output power to the output, and operating, responsive to selecting the freewheel mode of operation, the auxiliary branch to freewheel during flyback of the output.

In one embodiment, the method further includes selecting, based on the input voltage information and the output voltage information, one of a connection mode of operation and a stop mode of operation. In some embodiments, the method includes selecting, responsive to determining that the voltage level of the AC input power is equal to the voltage level of the AC output power, the connection mode of operation, and selecting, responsive to determining that a polarity of the voltage level of the AC input power is opposite a polarity of the voltage level of the AC output power, the stop mode of operation.

According to one aspect of the disclosure, a UPS system is provided including an input configured to receive AC input power, an output configured to provide AC output power to at least one load, a rectifier coupled to the input, an inverter coupled to the rectifier at a first connection, and the output at a second connection, an auxiliary branch coupled to the input at a first connection, and the output at a second connection, and means for selecting a buck mode of operation responsive to a first condition being met and a freewheel mode of operation responsive to a second condition being met, and for controlling at least one of the rectifier, the inverter, and the auxiliary branch based on the selected mode of operation.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects and examples are directed to increased-efficiency power converter and inverter modules which may be particularly advantageous when implemented in Uninterruptible Power Supplies (UPSs). Existing approaches to switch-based power conversion are subject to switching losses which lower the efficiency of the power converter. Examples provided herein address the foregoing deficiencies to provide power conversion with increased conversion efficiency.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
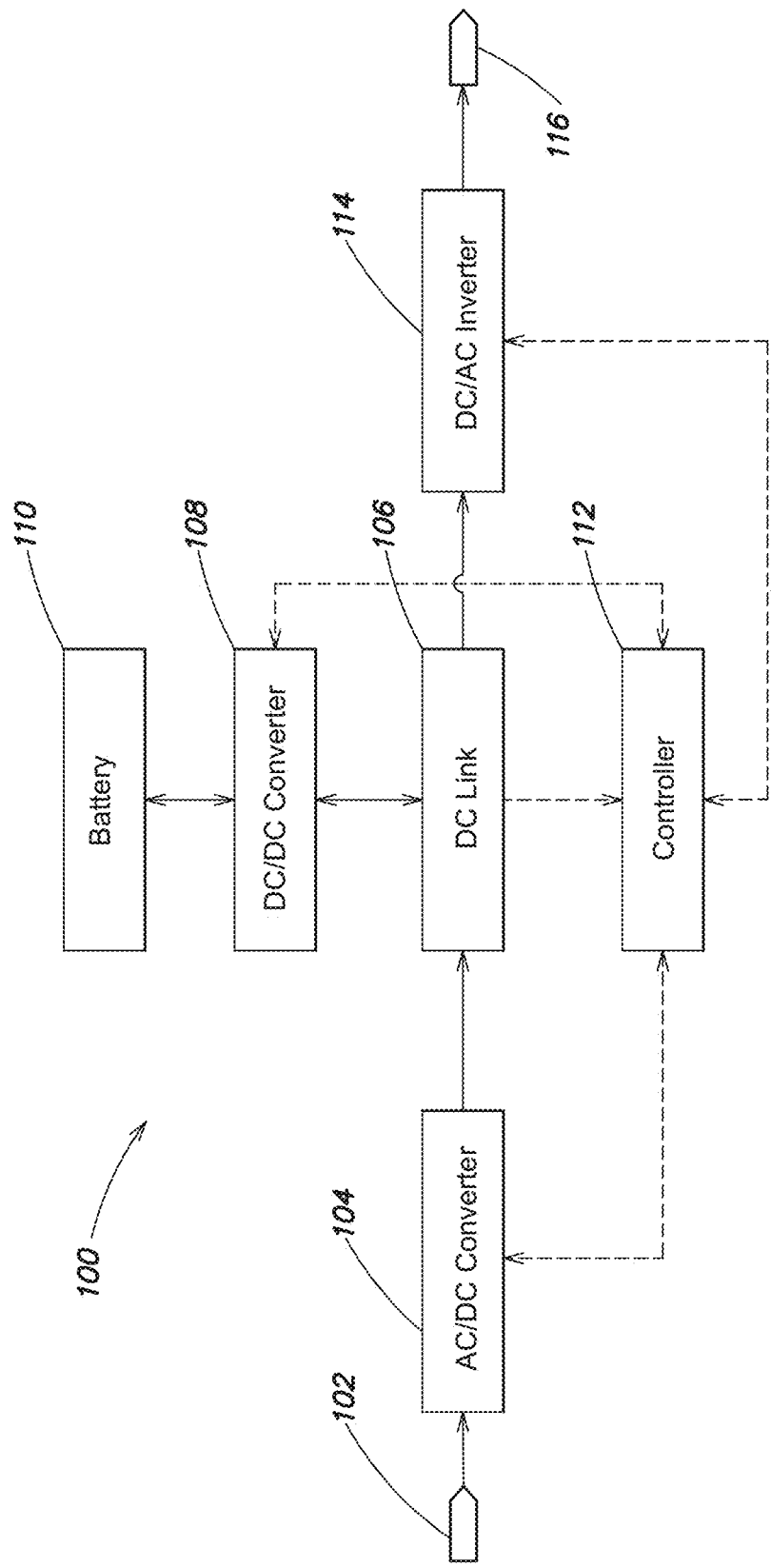
FIG. 1 is a block diagram of an Uninterruptible Power Supply (UPS)

As discussed above, many conventional Uninterruptible Power Supplies (UPSs) include at least one converter module and at least one inverter module. FIG. 1 is a block diagram of a conventional UPS 100. The UPS 100 includes an input 102, an AC/DC converter 104, a DC link 106, a DC/DC converter 108, a battery 110, a controller 112, a DC/AC inverter 114, and an output 116. The input 102 is coupled to the AC/DC converter 104 and an AC power source (not pictured), such as an AC mains power supply. The AC/DC converter 104 is coupled to the input 102 and to the DC link 106, and is communicatively coupled to the controller 112. The DC link 106 is coupled to the AC/DC converter 104, the DC/DC converter 108, and to the DC/AC inverter 114. The DC/DC converter 108 is coupled to the DC link 106 and to the battery 110, and is communicatively coupled to the controller 112. The battery 110 is coupled to the DC/DC converter 108. The DC/AC inverter 114 is coupled to the DC link 106 and to the output 116, and is communicatively coupled to the controller 112. The output 116 is coupled to the DC/AC inverter 114, and to an external load (not pictured).

The input 102 is configured to be coupled to an AC mains power source to receive input AC power having an input voltage level. For example, the input 102 may be configured to receive one-phase AC mains power, three-phase AC mains power, or input power having a different number of phases. The UPS 100 is configured to operate in different modes of operation based on the input voltage level of the AC power provided to the input 102. When AC power provided to the input 102 is acceptable (i.e., by having parameters that meet specified values), the UPS 100 operates in a normal mode of operation.

In the normal mode of operation, AC power received at the input 102 is provided to the AC/DC converter 104. The AC/DC converter 104 converts the AC power into DC power and provides the DC power to the DC link 106. The DC link 106 distributes the DC power to the DC/DC converter 108 and to the DC/AC inverter 114. The DC/DC converter 108 converts the received DC power and provides the converted DC power to the battery 110 to charge the battery 110. The DC/AC inverter 114 receives DC power from the DC link 106, converts the DC power into regulated AC power, and provides the regulated AC power to the output 116 to be delivered to a load.

When AC power provided to the input 102 from the AC mains power source is not acceptable (i.e., by having parameters that do not meet specified values), the UPS 100 operates in a backup mode of operation. In the backup mode of operation, DC power is discharged from the battery 110 to the DC/DC converter 108. The DC/DC converter 108 converts the received DC power and provides the DC power to the DC link 106. The DC link 106 provides the received power to the DC/AC inverter 114. The DC/AC inverter 114 receives the DC power from the DC link 106, converts the DC power into regulated AC power, and provides the regulated AC power to the output 116.

During the backup mode of operation, power provided to the DC link 106 is provided by the battery 110, and during the normal mode of operation, power provided to the DC link 106 is provided by a power source connected to the input 102. Power provided to the DC link 106 is subsequently drawn by the DC/AC inverter 114 to generate AC power, and to supply the AC power to an external load connected to the output 116.

Figure 2A:
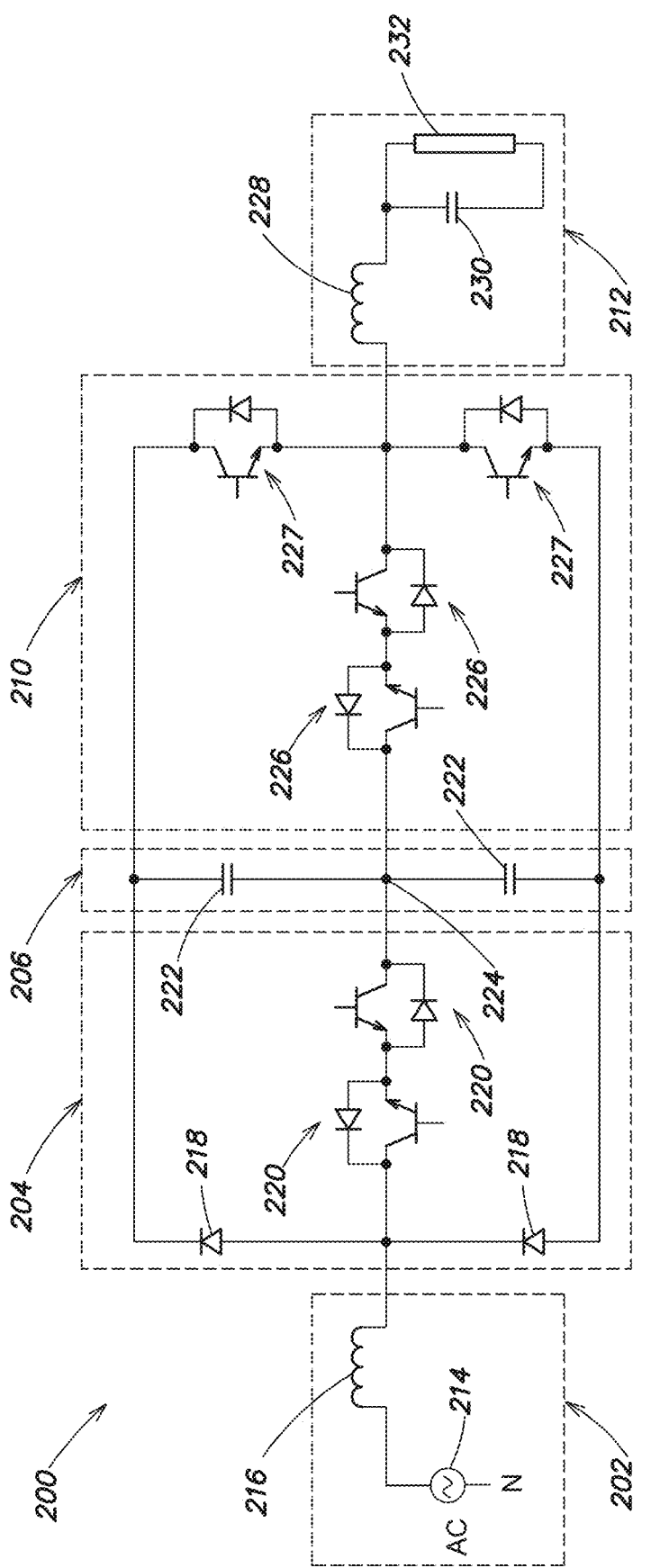
FIG. 2A is a circuit diagram of a one-phase 3-level Neutral Point Clamped (NPC) topology.

The AC/DC converter 104 and the DC/AC inverter 114 may be implemented according to one of several topologies. FIG. 2A illustrates a circuit level diagram of a conventional 3-level Neutral Point Clamped (NPC) topology 200. The topology 200 may correspond to a single phase of a one-phase system, or may correspond to a single phase of a three-phase power conversion system. The topology 200 includes an input 202, a AC/DC converter 204, a DC link 206, a controller 208, a DC/AC inverter 210, and an output 212.

The input 202 includes an AC power input 214 configured to receive one phase of a three-phase AC input power and an inductor 216 configured to filter the AC power received from the AC power input 214. The AC/DC converter 204 includes diodes 218 and switches 220 configured to rectify the input AC power to DC power, and provide the DC power to the DC link 206. The DC link 206 includes a pair of capacitors 222 connected via a neutral point 224.

The DC/AC inverter 210 includes freewheeling switches 226 and inverting switches 227 configured to invert DC power received from the AC/DC converter 204 to AC power, and provide the AC power to the output 212. The output 212 includes an inductor 228 and a capacitor 230 configured to filter output AC power, and a load 232 configured to receive the output AC power. The controller 208 is communicatively coupled to the switches 220, the freewheeling switches 226, and the inverting switches 227, and is configured to control switching operation of the switches 220, the freewheeling switches 226, and the inverting switches 227.

Figure 2B:
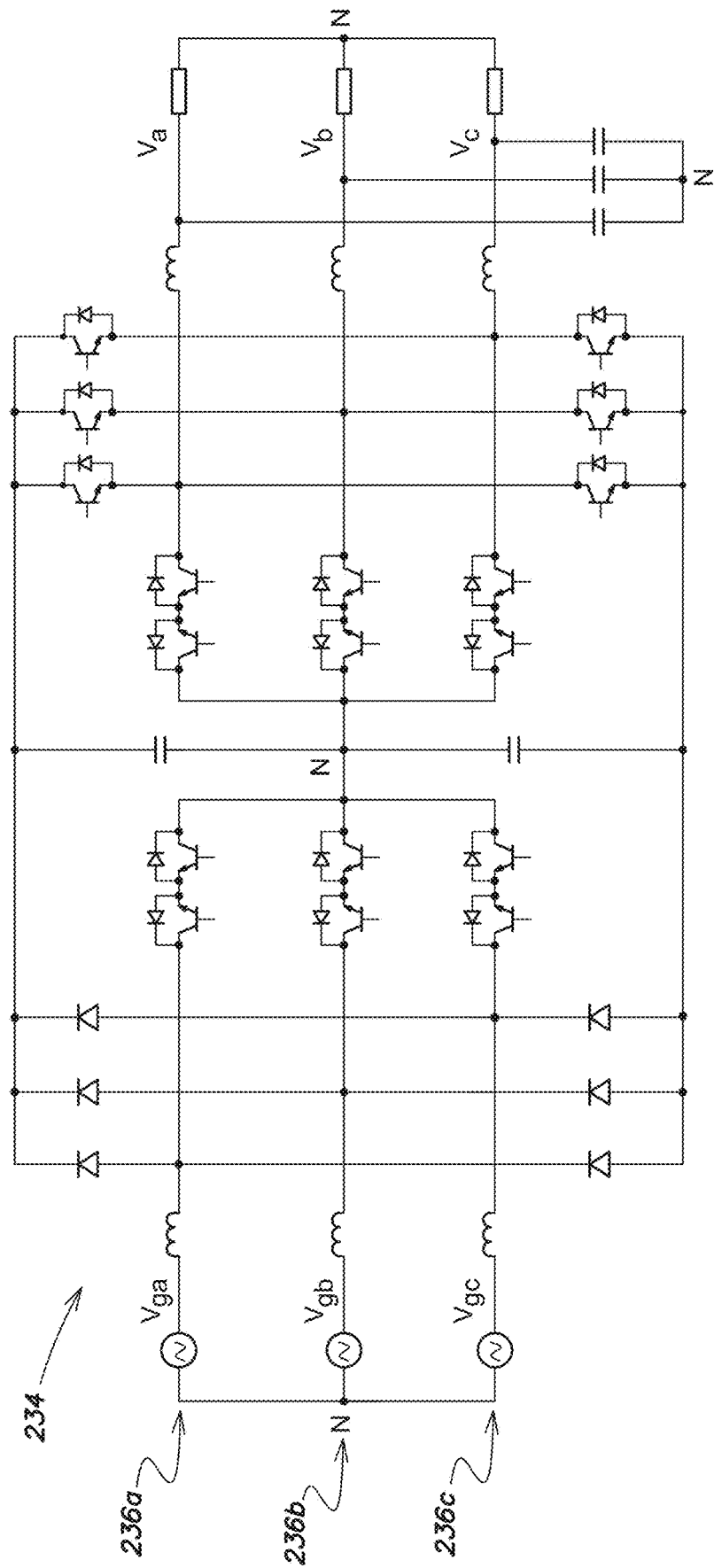
FIG. 2B is a circuit diagram of a three-phase 3-level NPC topology.

As discussed above, the topology 200 may represent one phase of a three-phase system. For example, FIG. 2B illustrates a three-phase 3-level NPC converter 234 including a first arm 230a, a second arm 230b, and a third arm 230c, each of which may be embodied by the topology 200. In some implementations, the three-phase 3-level NPC converter 234 may be capable of providing approximately 50 kW of power-factor-corrected power with relatively high efficiency. However, the efficiency of the three-phase 3-level NPC converter 234 is limited by switching losses, including switching losses in the switches 220, the freewheeling switches 226, and the inverting switches 227. As power conversion efficiency decreases, power density decreases and heat production increases, which may be disadvantageous. Accordingly, it may be advantageous to provide a 3-level NPC topology with increased power conversion efficiency.

Figure 3A:
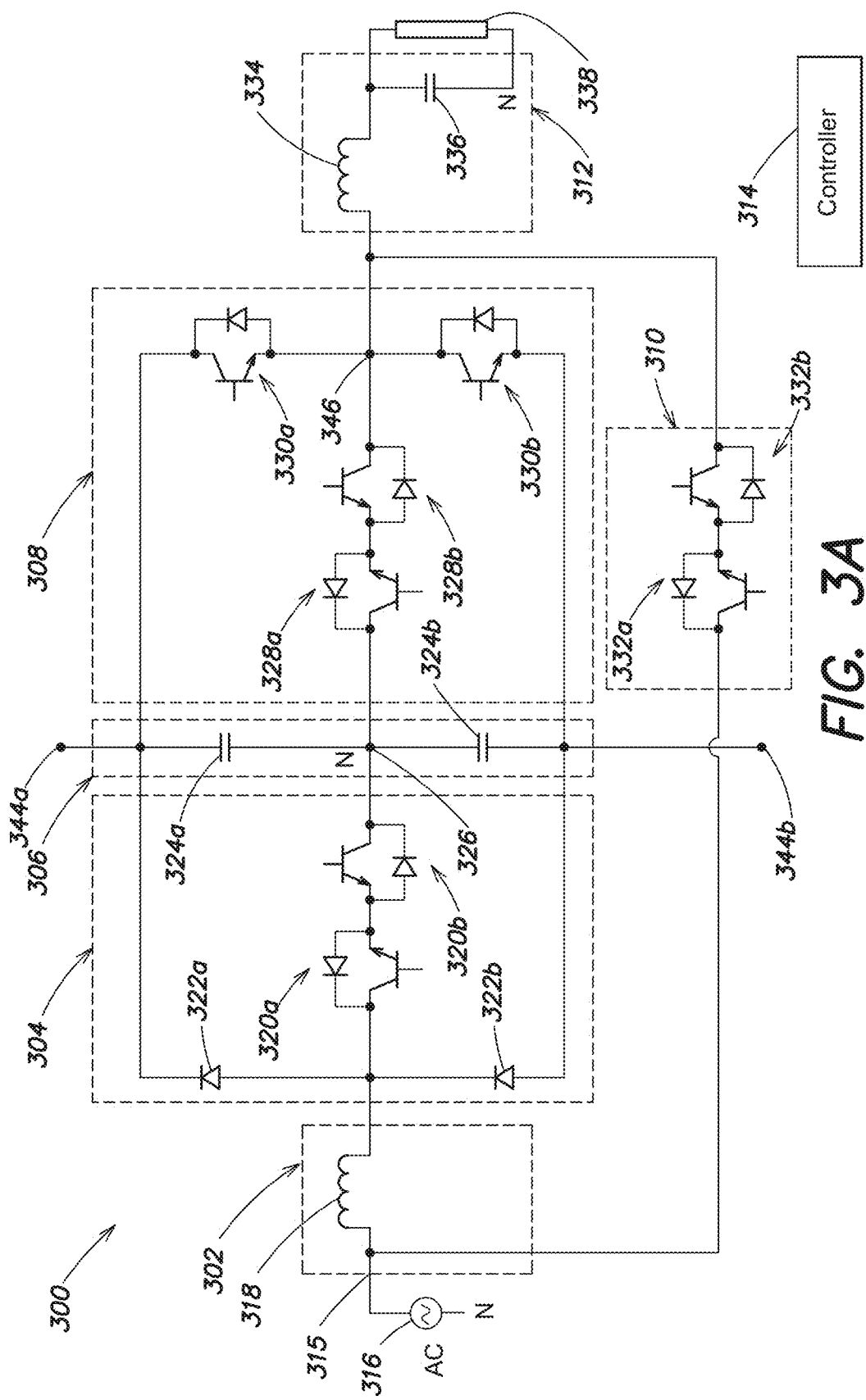
FIG. 3A is a circuit diagram of a one-phase of a 3-level NPC topology according to an embodiment.
Figure 3B:
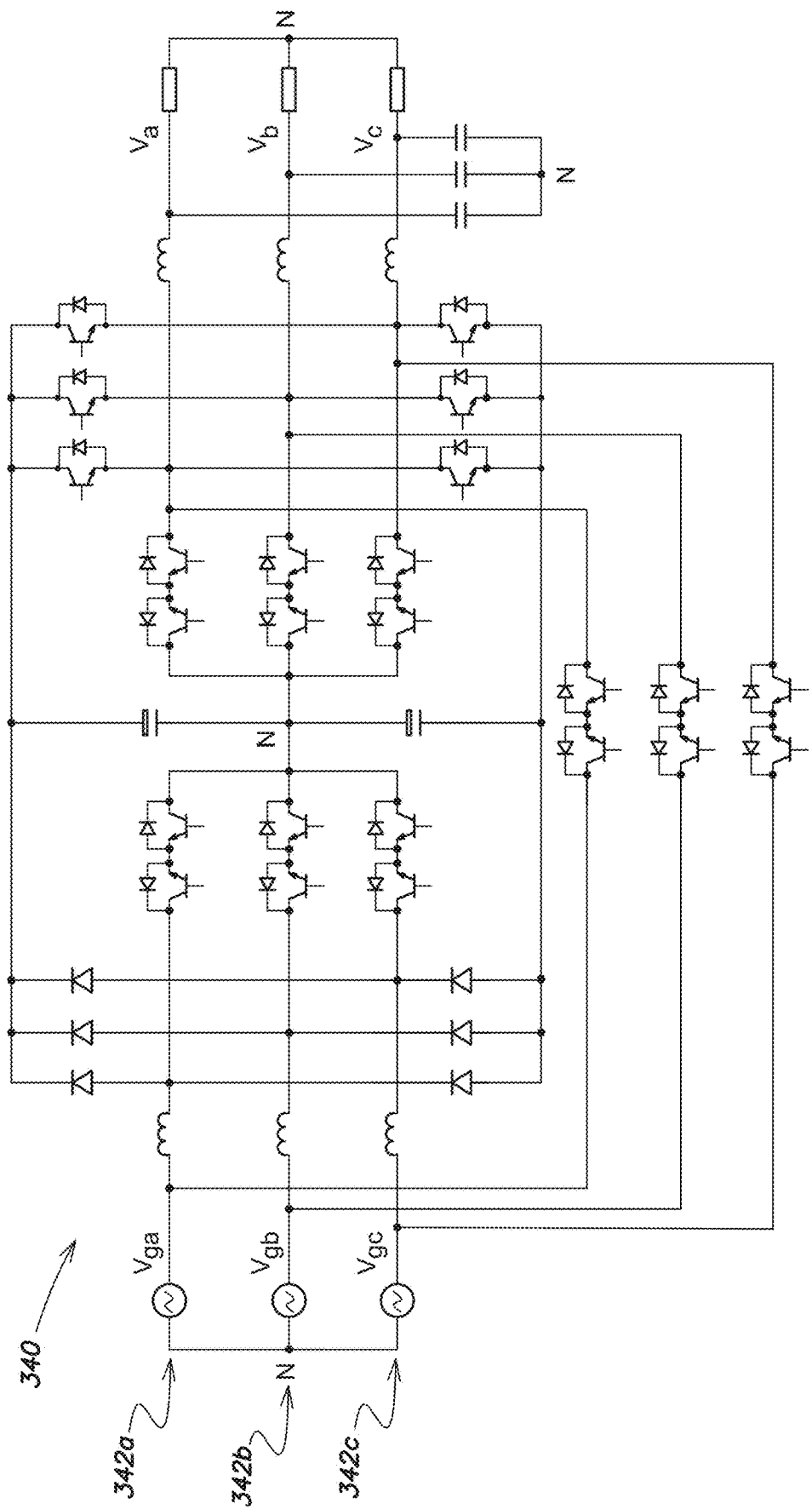
FIG. 3B is a circuit diagram of a three-phase 3-level NPC topology according to an embodiment.

FIG. 3A illustrates a high-efficiency 3-level NPC topology 300 according to one embodiment of the present disclosure. The converter 300 may be used, for example, in the UPS 100, shown in FIG. 1. The converter 300 may correspond to a single phase of a single-phase system, a single phase of a three-phase system, or a single phase of a system with an alternate number of phases. For example, FIG. 3B illustrates a three-phase 3-level inverter topology 340 including a first arm 342a, a second arm 342b, and a third arm 342c, each of which may be embodied in connection with the high-efficiency 3-level NPC converter 300.

Returning to FIG. 3A, the 3-level NPC converter 300 includes an input portion 302, a rectifier portion 304, a DC link portion 306, an inverter portion 308, an auxiliary branch portion 310, an output portion 312, and a controller 314. The input portion 302 is generally configured to receive input AC power, and filter the AC input power. The rectifier portion 304 is generally configured to receive the AC input power, convert the AC input power to DC power, and provide the DC power to the DC link portion 306.

The DC link portion 306 is generally configured to receive the DC power, charge one or more energy storage devices with the received DC power, and discharge the one or more energy storage devices to the inverter portion 308.

In some embodiments, the DC link portion 306 may include a first reserve power supply node 344a and a second reserve power supply node 344b. The reserve power supply nodes 344a, 344b may be configured to be coupled to a reserve power supply, such as a battery or flywheel. For example, the reserve power supply may behave similarly to the battery 110 discussed above with respect to FIG. 1. In other embodiments, the reserve power supply nodes 344a, 344b may be omitted.

The inverter portion 308 is generally configured to receive discharged DC power from the DC link portion 306, convert the received discharged DC power to AC power, and provide the AC power to the output portion 312. The auxiliary branch portion 310 is generally configured to selectively provide or receive power to or from at least one of the inverter portion 308 and the output portion 312. The output portion 312 is generally configured to provide AC output power received from at least one of the inverter portion 308 and the auxiliary branch portion 310 to one or more loads.

The input portion 302 includes an input 315 configured to be coupled to AC power input source 316 (for example, an AC mains power supply), and a filtering inductor 318. The rectifier portion 304 includes a first switch 320a, a second switch 320b, a first diode 322a, and a second diode 322b. The DC link portion 306 includes a first capacitor 324a, a second capacitor 324b, and a neutral point 326. The inverter portion 308 includes a first freewheeling switch 328a, a second freewheeling switch 328b, a first main branch switch 330a, and a second main branch switch 330b. The auxiliary branch portion 310 includes a first auxiliary switch 332a and a second auxiliary switch 332b. The output portion 312 includes a filtering inductor 334, a filtering capacitor 336, and is configured to be coupled to a load 338.

The AC power input source 316 is coupled to the neutral point 326 at a first connection, and is coupled to the filtering inductor 318 and the first auxiliary switch 332a at a second connection. The filtering inductor 318 is coupled to the AC power input source 316 and the first auxiliary switch 332a at a first connection, and is coupled to the first diode 322a, the second diode 322b, and the first switch 320a at a second connection. The first switch 320a is coupled to the filtering inductor 318, the first diode 322a, and the second diode 322b at a first connection, is coupled to the second switch 320b at a second connection, and is configured to be communicatively coupled to the controller 314. The second switch 320b is coupled to the first switch 320a at a first connection, is coupled to the neutral point 326 at a second connection, and is communicatively coupled to the controller 314.

The first diode 322a is coupled to the filtering inductor 318, the second diode 322b, and the first switch 320a at an anode connection, and is coupled to the first capacitor 324a and the first main branch switch 330a at a cathode connection. The second diode 322b is coupled to the filtering inductor 318, the first switch 320a, and the first diode 322a at the second diode's 322b cathode connection, and is coupled to the second capacitor 324b and the second main branch switch 330b at an anode connection.

The first capacitor 324a is coupled to the first diode 322a and the first main branch switch 330a at a first connection, and is coupled to the neutral point 326 at a second connection. The second capacitor 324b is coupled to the neutral point 326 at a first connection, and is coupled to the second diode 322b and the second main branch switch 330b at a second connection. The neutral point 326 is coupled to the second switch 320b, the first capacitor 324a, the second capacitor 324b, and the first freewheeling switch 328a.

The first freewheeling switch 328a is coupled to the neutral point 326 at a first connection, is coupled to the second freewheeling switch 328b at a second connection, and is communicatively coupled to the controller 314. The second freewheeling switch 328b is coupled to the first freewheeling switch 328a at a first connection, is coupled to the first main branch switch 330a, the second main branch switch 330b, the second auxiliary switch 332b, and the filtering inductor 334 at a second connection, and is communicatively coupled to the controller 314.

The first main branch switch 330a is coupled to the first diode 322a and the first capacitor 324a at a first connection, is coupled to the second freewheeling switch 328b, the second auxiliary switch 332b, the filtering inductor 334, and the second main branch switch 330b at a second connection, and is communicatively coupled to the controller 314. The second main branch switch 330b is coupled to the second freewheeling switch 328b, the first main branch switch 330a, the second auxiliary switch 332b, and the filtering inductor 334 at a first connection, is coupled to the second diode 322b and the second capacitor 324b at a second connection, and is communicatively coupled to the controller 314.

The first auxiliary switch 332a is coupled to the AC power input source 316 and the filtering inductor 318 at a first connection, is coupled to the second auxiliary switch 332b at a second connection, and is communicatively coupled to the controller 314. The second auxiliary switch 332b is coupled to the first auxiliary switch 332a at a first connection, is coupled to the second freewheeling switch 328b, the first main branch switch 330a, the second main branch switch 330b, and the filtering inductor 334 at a second connection, and is communicatively coupled to the controller 314.

The filtering inductor 334 is coupled to the second freewheeling switch 328b, the first main branch switch 330a, the second main branch switch 330b, and the second auxiliary switch 332b at a first connection, is coupled to the filtering capacitor 336 at a second connection, and is configured to be coupled to the load 338 at the second connection. The filtering capacitor 326 is coupled to the inductor 334 at a first connection, and is configured to be coupled in parallel with the load 338.

The load 338 is configured to be coupled to the inductor 334 at a first connection, and is configured to be coupled in parallel with the capacitor 336. The controller 314 is configured to be communicatively coupled to the first switch 320a, the second switch 320b, the first freewheeling switch 328a, the second freewheeling switch 328b, the first main branch switch 330a, the second main branch switch 330b, the first auxiliary switch 332a, and the second auxiliary switch 332b. In some embodiments, the controller 314 may receive information indicative of an input voltage waveform provided by the AC power input source 316, and information indicative of an output voltage waveform provided by the output portion 312 to the load 338. For example, the controller 314 may be coupled to one or more sensors configured to provide information indicative of the foregoing voltage information.

As discussed above, the auxiliary branch portion 310 is generally configured to selectively provide or receive power to or from one or more of the inverter portion 308 and the output portion 312 to increase the efficiency of the converter 300. In at least one embodiment, operation of the auxiliary branch portion 310 may be conceptually divided into four modes of operation. The four modes of operation are nominally referred to as a connection mode, a stop mode, a buck mode, and a freewheel mode. In at least one embodiment, the controller 314 selects one of the four modes of operation based on input voltage information and output voltage information, and provides one or more switching signals according to the selected mode of operation. Accordingly, the modes of operation correspond to one or more control signals communicated by the controller 314 to one or more switches associated with at least one of the rectifier portion 304, the inverter portion 308, and the auxiliary branch portion 310.

Figure 4:
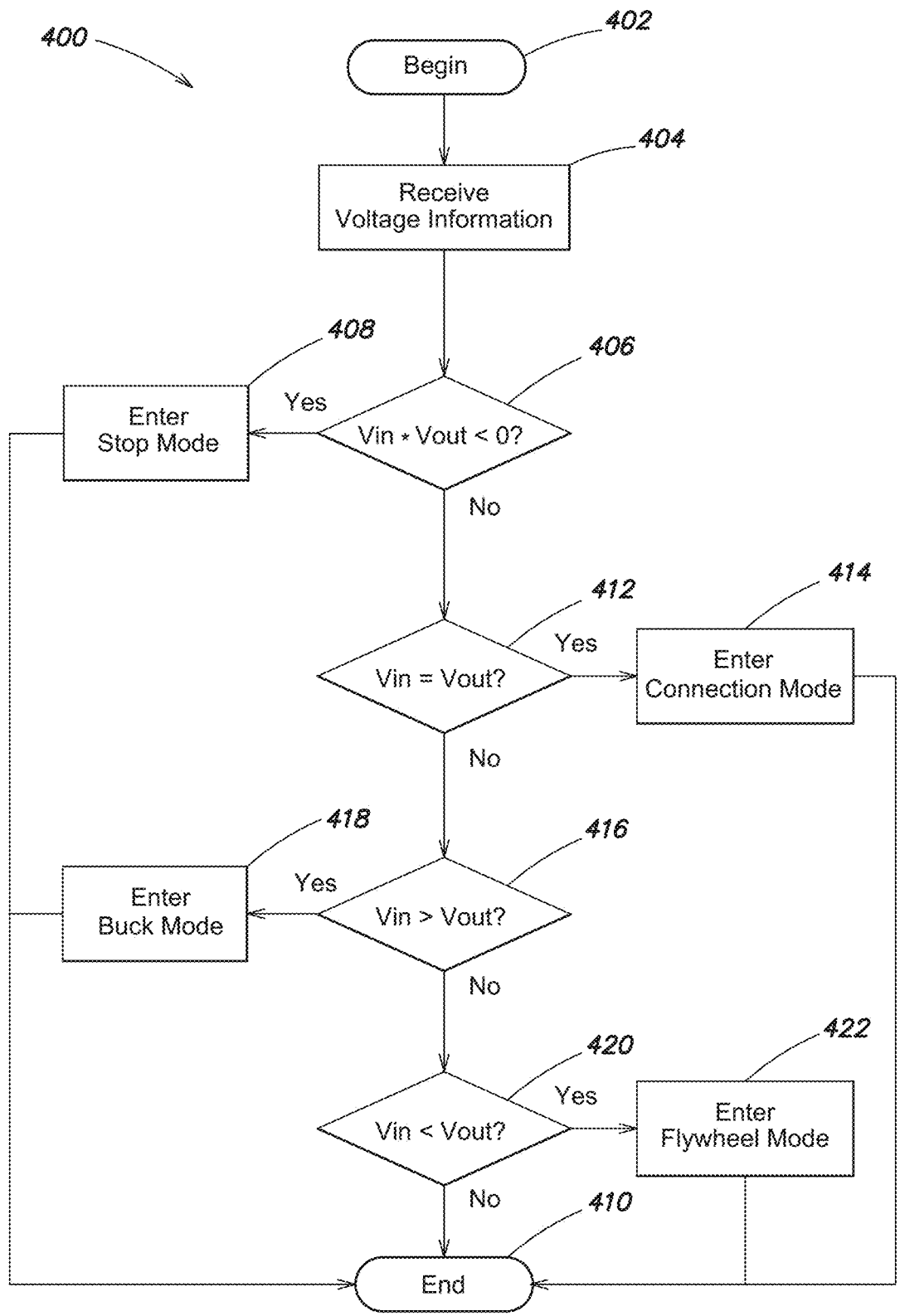
FIG. 4 is a flow chart of a process for selecting a mode of operation according to an embodiment.

FIG. 4 illustrates a process 400 to determine a mode of operation of a power converter according to an embodiment. The process 400 may be executed by the controller 314 in connection with the 3-level NPC converter 300. At act 402, the process 400 begins. At act 404, voltage information is received. For example, the controller 314 may receive voltage information indicative of an input voltage provided by the AC voltage source 316, $V_{in}$, and voltage information indicative of output voltage information, $V_{out}$, provided to the load 338. At act 406, a determination is made as to whether the product of $V_{in}$ and $V_{out}$ is less than zero (i.e., having a negative value). For example, the controller 314 may execute an operation to determine whether a polarity of $V_{in}$ (for example, positive or negative) is opposite a polarity of $V_{out}$ (for example, negative or positive). If so (406 YES), then the process 400 continues to act 408. At act 408, a stop mode is entered, as discussed in greater detail below with respect to FIG. 5, and the process 400 ends at act 410. Otherwise (406 NO), the process 400 continues to act 412.

At act 412, a determination is made as to whether $V_{in}$ is equal to $V_{out}$. In some embodiments, a determination may be made as to whether $V_{in}$ is approximately equal to $V_{out}$. For example, the controller 314 may determine that $V_{in}$ is approximately equal to $V_{out}$ responsive to determining that $V_{in}$ is within a threshold range (for example, 2%) of $V_{out}$, where the threshold range may be adjustably specified by a user or may be adjustably calculated by the controller 314.

If $V_{in}$ is considered to be equal to $V_{out}$ (412 YES), then the process 400 continues to act 414. At act 414, a connection mode is entered, as discussed in greater detail below with respect to FIG. 6, and the process 400 ends at act 410. Otherwise (412 NO), the process 400 continues to act 416. At act 416, a determination is made as to whether $V_{in}$ is greater than $V_{out}$. For example, the determination may be made by the controller 314. If so (416 YES), then the process 400 continues to act 418.

At act 418, a buck mode is entered, as discussed in greater detail below with respect to FIG. 7, and the process 400 ends at act 410. If $V_{in}$ is not greater than $V_{out}$ (416 NO), the process 400 continues to act 420. At act 420, a determination is made as to whether Vin is less than Vout. For example, the determination may be made by the controller 314. If so (420 YES), then the process continues to act 422. At act 422, a freewheel mode is entered, as discussed in greater detail below with respect to FIG. 8, and the process 400 ends at act 410. Otherwise (420 NO), the process 400 ends at act 410.

Modifications to the process 400 are intended to be within the scope of this disclosure. For example, in some embodiments, the order of the acts 406, 412, 416, and 420 may be adjusted. In another embodiment, act 420 may be omitted. For example, the controller may determine that if $V_{in}$ does not have an opposite polarity of $V_{out}$ (406 NO), is not equal to $V_{out}$ (412 NO), and is not greater than $V_{out}$ (416 NO), then $V_{in}$ must be less than $V_{out}$. Accordingly, the determination 416 NO may proceed directly to act 422.

Figure 5:
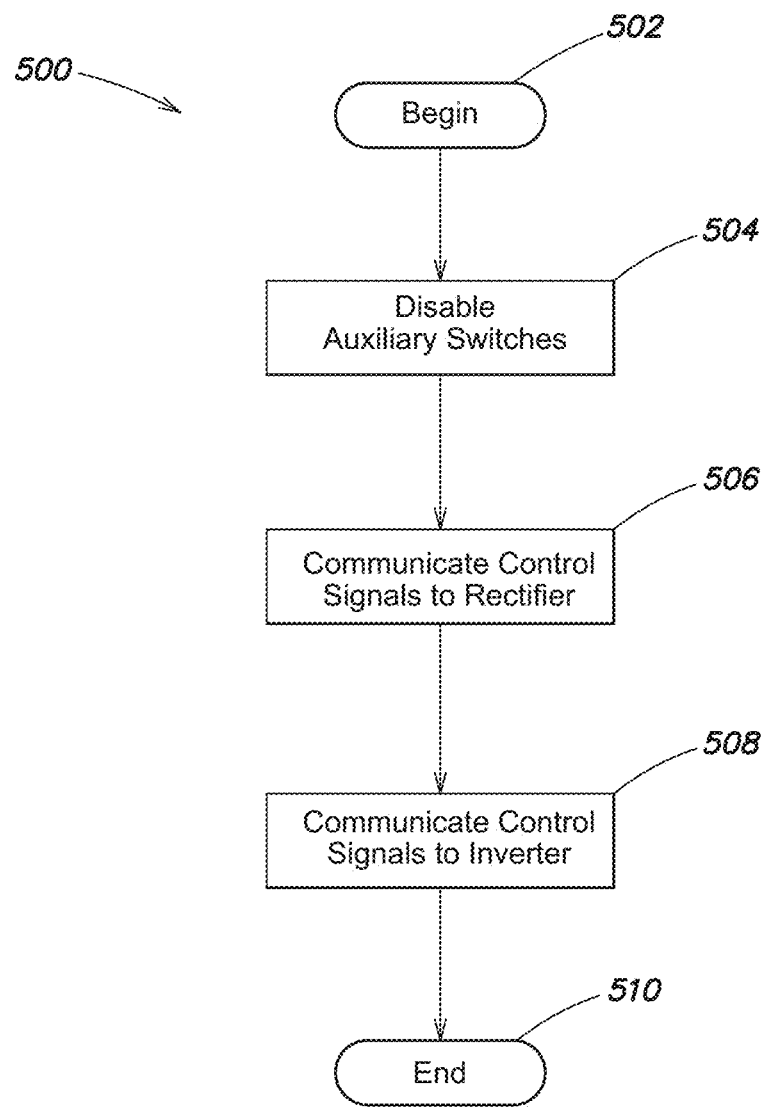
FIG. 5 is a flow chart of a process for executing a stop mode of operation according to an embodiment.

FIG. 5 illustrates a process 500 of executing a stop mode of operation according to an embodiment. For example, the process 500 may be executed by the controller 314 responsive to determining that a polarity of $V_{in}$ is opposite a polarity of $V_{out}$. Generally speaking, the auxiliary branch portion 310 is disabled during the stop mode of operation, and the rectifier portion 304 and the inverter portion 308 operate normally during the stop mode of operation to produce a desired output voltage, $V_{out}$. Because the polarity of $V_{in}$ is opposite the polarity of $V_{out}$, it may not be advantageous to provide $V_{in}$ directly to the load 338. Accordingly, the stop mode of operation may be implemented to prevent the auxiliary branch portion 310 from providing $V_{in}$ directly to the load 338. The process 500 includes acts of disabling auxiliary switches 504, communicating control signals to a rectifier 506, and communicating control signals to an inverter 508.

At act 502, the process 500 begins. At act 504, auxiliary switches are disabled. For example, the controller 314 may disable the first auxiliary switch 332a and the second auxiliary switch 332b. Disabling the first auxiliary switch 332a and the second auxiliary switch 332b may include opening the first auxiliary switch 332a and the second auxiliary switch 332b such that the first auxiliary switch 332a and the second auxiliary switch 332b are in a non-conductive state. In some embodiments, disabling the first auxiliary switch 332a and the second auxiliary switch 332b by the controller 314 may include the controller 314 not communicating control signals to the first auxiliary switch 332a and the second auxiliary switch 332b. For example, where the first auxiliary switch 332a and the second auxiliary switch 332b are normally-open switches, disabling the first auxiliary switch 332a and the second auxiliary switch 332b may include not providing control signals to the first auxiliary switch 332a and the second auxiliary switch 332b.

At act 506, control signals are communicated to a rectifier. For example, the controller 314 may communicate one or more control signals to the rectifier portion 304 to operate the first switch 320a and the second switch 320b. Operating the first switch 320a and the second switch 320b may include actuating the first switch 320a and the second switch 320b between an open and non-conducting state and a closed and conducting state to rectify input voltage provided by the AC voltage source 316, and providing the rectified input voltage to the DC link 306 to charge the first capacitor 324a and/or the second capacitor 324b.

At act 508, control signals are communicated to an inverter. For example, the controller 314 may communicate one or more control signals to the inverter portion 308 to operate the first main branch switch 330a, the second main branch switch 330b, the first freewheeling switch 328a, and the second freewheeling switch 328b. Operating the first main branch switch 330a, the second main branch switch 330b, the first freewheeling switch 328a, and the second freewheeling switch 328b may include actuating the first main branch switch 330a, the second main branch switch 330b, the first freewheeling switch 328a, and the second freewheeling switch 328b between an open and non-conducting state and a closed and conducting state to invert DC voltage drawn from the first capacitor 324a and/or the second capacitor 324b.

At act 510, the process 500 ends. For example, the first main branch switch 330a and the second main branch switch 330b may be actuated to produce a desired output voltage, $V_{out}$, and the first freewheeling switch 328a and the second freewheeling switch 328b may be actuated to address flyback from the inductor 334.

Figure 6:
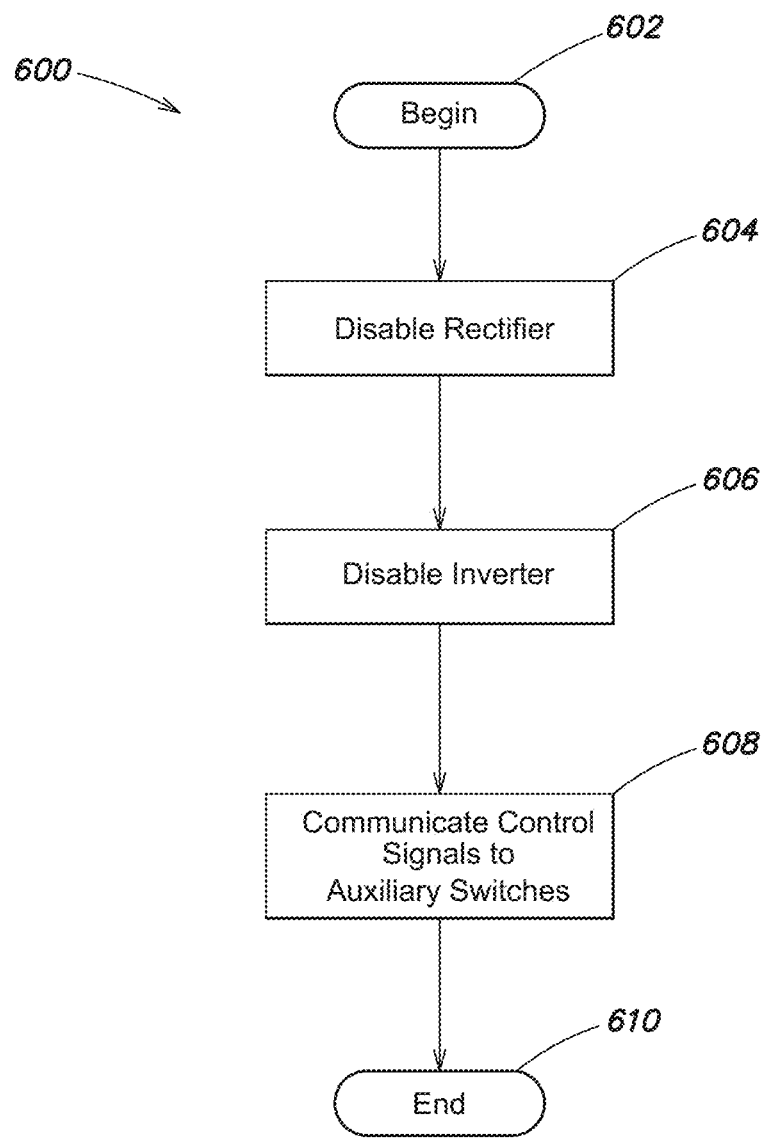
FIG. 6 is a flow chart of a process for executing a connection mode of operation according to an embodiment.

FIG. 6 illustrates a process 600 of executing a connection mode of operation according to an embodiment. For example, the process 600 may be executed by the controller 314 responsive to determining that $V_{in}$ is approximately equal to $V_{out}$. Generally speaking, the auxiliary branch portion 310 is enabled during the connection mode of operation to conduct power from the AC power input source 316 to the output portion 312, effectively bypassing the rectifier portion 304, the DC link 306, and the inverter portion 308. The process 600 includes acts of disabling a rectifier 604, disabling an inverter 606, and communicating control signals to auxiliary switches 608.

At act 602, the process 600 begins. At act 604, a rectifier is disabled. For example, the controller 314 may disable the first switch 320a and the second switch 320b of the rectifier portion 304. Disabling the first switch 320a and the second switch 320b may include opening the first switch 320a and the second switch 320b such that the first switch 302a and the second switch 320b are in a non-conductive state. In some embodiments, disabling the first switch 320a and the second switch 320b by the controller 314 may include the controller 314 communicating no control signals. For example, where the first switch 320a and the second switch 320b are normally-open switches, disabling the first switch 320a and the second switch 320b may include not providing control signals to the first switch 320a and the second switch 320b.

At act 606, an inverter is disabled. For example, the controller 314 may disable the first main branch switch 330a, the second main branch switch 330b, the first freewheeling switch 328a, and the second freewheeling switch 328b of the inverter portion 308. Disabling the first main branch switch 330a, the second main branch switch 330b, the first freewheeling switch 328a, and the second freewheeling switch 328b may include opening the first main branch switch 330a, the second main branch switch 330b, the first freewheeling switch 328a, and the second freewheeling switch 328b such that the first main branch switch 330a, the second main branch switch 330b, the first freewheeling switch 328a, and the second freewheeling switch 328b are in a non-conductive state.

In some embodiments, disabling the first main branch switch 330a, the second main branch switch 330b, the first freewheeling switch 328a, and the second freewheeling switch 328b by the controller 314 may include the controller 314 communicating no control signals. For example, where the first main branch switch 330a, the second main branch switch 330b, the first freewheeling switch 328a, and the second freewheeling switch 328b are normally-open switches, disabling the first main branch switch 330a, the second main branch switch 330b, the first freewheeling switch 328a, and the second freewheeling switch 328b may include not providing control signals to the first main branch switch 330a, the second main branch switch 330b, the first freewheeling switch 328a, and the second freewheeling switch 328b.

At act 608, control signals are communicated to auxiliary switches. For example, the controller 314 may provide one or more control signals to the first auxiliary switch 332a and to the second auxiliary switch 332b. In some embodiments, the controller 314 may operate the first auxiliary switch 332a and the second auxiliary switch 332b to be in a closed and conducting state, such that AC power provided by the AC power source 316 is provided directly to the output portion 312 via the auxiliary branch portion 310. AC power provided by the AC power source 316 may effectively bypass the rectifier portion 304 and the inverter portion 308, thereby increasing efficiency by minimizing switching losses in the rectifier portion 304 and the inverter portion 308 where the input voltage $V_{in}$ is already acceptable for output to the load 338. At act 610, the process 600 ends.

Figure 7:
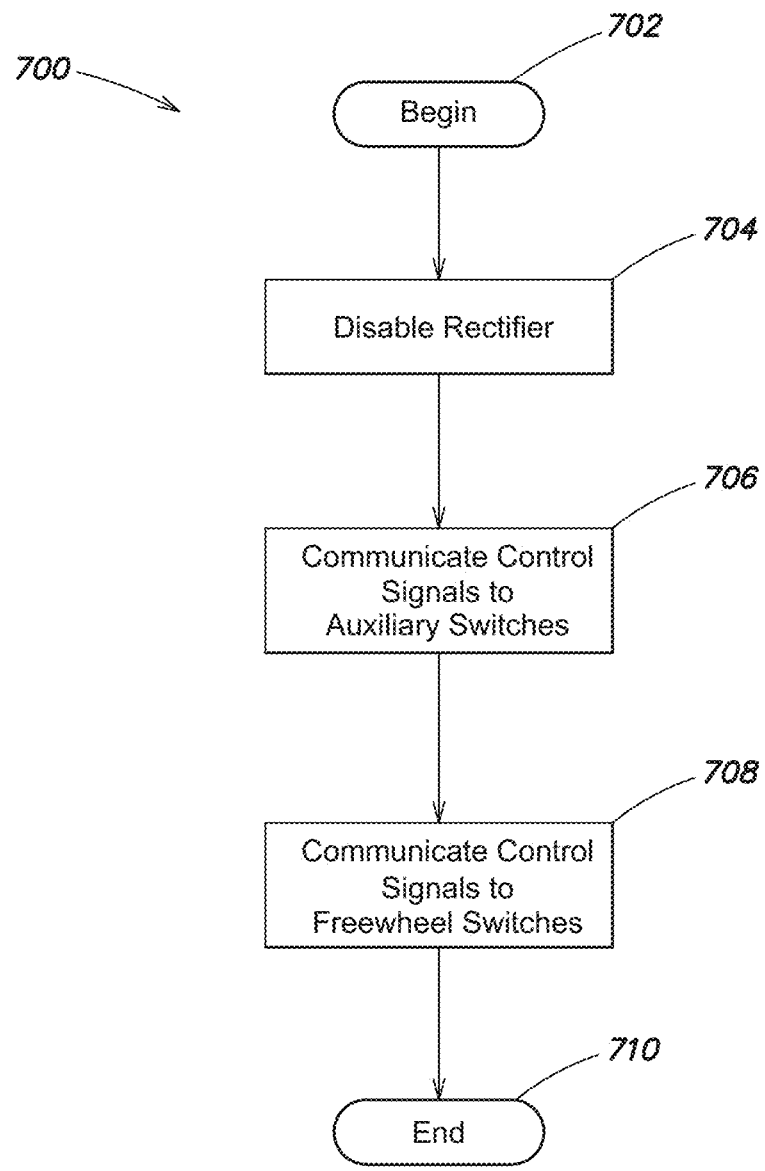
FIG. 7 is a flow chart of a process for executing a buck mode of operation according to an embodiment.

FIG. 7 illustrates a process 700 of executing a buck mode of operation according to an embodiment. For example, the process 700 may be executed by the controller 314 responsive to determining that $V_{in}$ is greater than $V_{out}$. In some embodiments, the process 700 may not be executed by the controller 314 until $V_{in}$ exceeds a threshold value above $V_{out}$. For example, if $V_{in}$ is considered to be approximately equal to $V_{out}$ if $V_{in}$ is within 2% of $V_{out}$ then the process 700 may be executed by the controller 314 responsive to determining that $V_{in}$ is greater than 2% above $V_{out}$.

Generally speaking, the auxiliary branch portion 310 is selectively enabled during the buck mode of operation to conduct power from the AC power input source 316 to the output portion 312. The freewheeling switches 328a, 328b are selectively enabled to buck excess power, and the remaining switches are disabled. The process 700 includes acts of disabling a rectifier 704, disabling main branch switches 706, and communicating control signals to auxiliary switches and freewheeling switches 708.

At act 702, the process 700 begins. At act 704, a rectifier is disabled. For example, the controller 314 may disable the rectifier portion 304 by disabling the first switch 320a and the second switch 320b. As discussed above, disabling the first switch 320a and the second switch 320b may include maintaining the first switch 320a and the second switch 320b in an open and non-conducting state, such as by not providing control signals to the first switch 320a and the second switch 320b.

At act 706, main branch switches are disabled. For example, the controller 314 may disable the first main branch switch 330a and the second main branch switch 330b by maintaining the first main branch switch 330a and the second main branch switch 330b in an open and non-conducting state, such as by not providing control signals to the first main branch switch 330a and the second main branch switch 330b.

At act 708, control signals are communicated to auxiliary switches and freewheeling switches. For example, the controller 314 may alternately provide one or more Pulse Width Modulation (PWM) control signals to the auxiliary switches 332a, 332b and to the freewheeling switches 328a, 328b. Because the AC power conducted by the auxiliary switches 332a, 332b exceeds the output power to be provided to the load 338, the freewheeling switches 328a, 328b are selectively enabled to buck the AC power conducted by the auxiliary switches 332a, 332b to a desired output level. For example, bucking the AC power may include alternately actuating the auxiliary switches 332, 332b and the freewheeling switches 328a, 328b such that $V_{out}$ has a voltage level between Vin (conducted by the auxiliary switches 332a, 332b) and the voltage level of the neutral point 326 (connected by the freewheeling switches 328a, 328b). At act 710, the process 700 ends.

Figure 8:
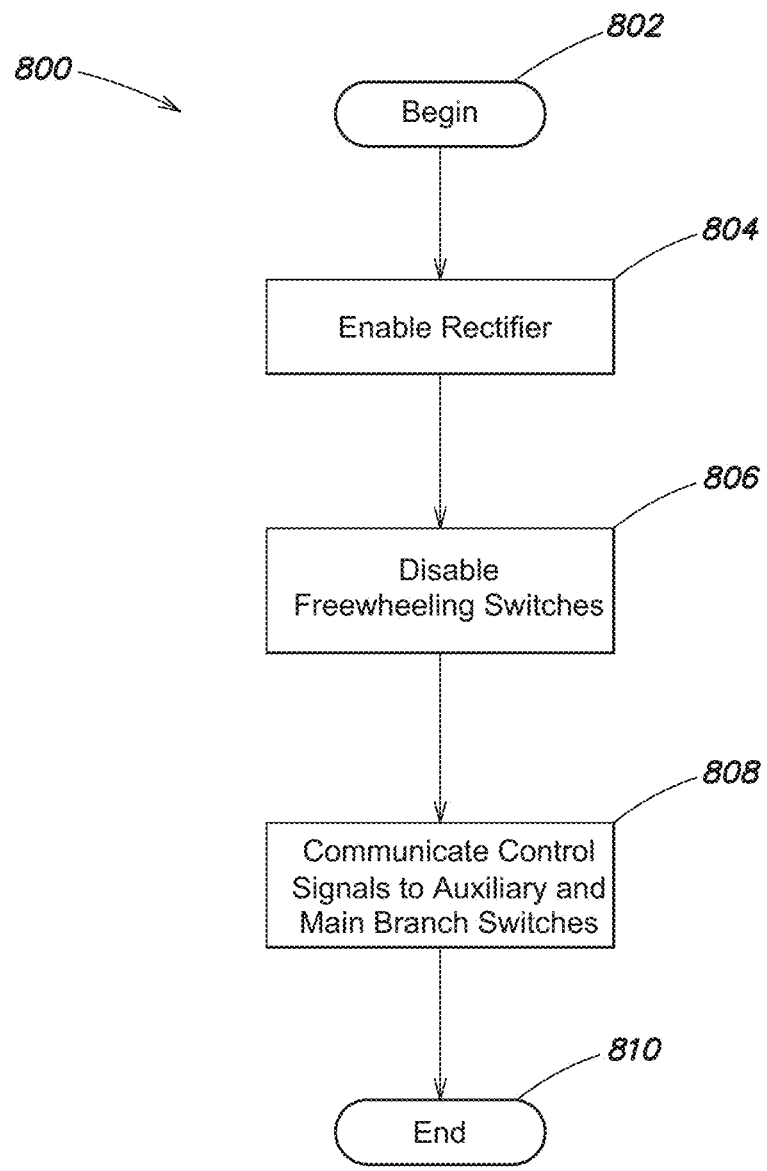
FIG. 8 is a flow chart of a process for executing a freewheel mode of operation according to an embodiment.

FIG. 8 illustrates a process 800 of executing a freewheel mode of operation according to an embodiment. For example, the process 800 may be executed by the controller 314 responsive to determining that $V_{in}$ is less than $V_{out}$. In some embodiments, the process 800 may not be executed by the controller 314 until $V_{out}$ exceeds a threshold value above $V_{in}$. For example, if $V_{in}$ is considered to be approximately equal to $V_{out}$ if $V_{in}$ is within 2% of then the process 800 may be executed by the controller 314 responsive to determining that $V_{out}$ is greater than 2% above $V_{in}$.

Generally speaking, the rectifier portion 304 and the main branch switches 330a, 330b are controlled to provide an AC output voltage to the output portion 312 during the freewheel mode of operation, while the auxiliary switches 332a, 332b behave as freewheeling switches. The process 800 includes acts of enabling a rectifier 804, disabling freewheeling switches 806, and communicating control signals to main branch switches and auxiliary switches 808.

At act 802, the process 800 begins. At act 804, one or more control signals are communicated to a rectifier. For example, the controller 314 may communicate one or more control signals to the first switch 320a and to the second switch 320b of the rectifier portion 304. As discussed above, operating the first switch 320a and the second switch 320b may include actuating the first switch 320a and the second switch 320b between an open and non-conducting state and a closed and conducting state to rectify input voltage provided by the AC voltage source 316, and providing the rectified input voltage to the DC link 306 to charge the first capacitor 324a and/or the second capacitor 324b.

At act 806, freewheeling switches are disabled. For example, the controller 314 may disable the first freewheeling switch 328a and the second freewheeling switch 328b. As discussed above, disabling the first freewheeling switch 328a and the second freewheeling switch 328b may include not providing control signals to the first freewheeling switch 328a and the second freewheeling switch 328b such that the first freewheeling switch 328a and the second freewheeling switch 328b do not conduct power.

At act 808, control signals are communicated to main branch switches and to auxiliary switches. For example, the controller 314 may communicate control signals to the first main branch switch 330a, the second main branch switch 330b, the first auxiliary switch 332a, and the second auxiliary switch 332b. Controlling the first main branch switch 330a and the second main branch switch 330b may include selectively opening and closing the first main branch switch 330a and the second main branch switch 330b such that DC power is drawn from the DC link portion 306, converted to AC power, and provided to the output portion 312.

Controlling the first auxiliary switch 332a and the second auxiliary switch 332b may include selectively opening and closing at least one of the first auxiliary switch 332a and the second auxiliary switch 332b such that power may freewheel through the auxiliary branch portion 310. For example, the second auxiliary switch 332b may be closed such that power may freewheel through the closed second auxiliary switch 332b and a reverse-connected diode of the first auxiliary switch 332a. At act 810, the process 800 ends.

The freewheeling mode of operation may provide several advantages as compared to, for example, using the first freewheeling switch 328a and the second freewheeling switch 328b to conduct during flyback. For example, consider a voltage $V_{node}$ at a node connecting the first main branch switch 330a, the second main branch switch 330b, the second freewheeling switch 328b, the second auxiliary switch 332b, and the inductor 334. If the first freewheeling switch 328a and the second freewheeling switch 328b conduct during flyback, a voltage drop across the first freewheeling switch 328a and the second freewheeling switch 328b is a difference between $V_{node}$ and a voltage level of the neutral point 326.

Conversely, if the first auxiliary switch 332a and the second auxiliary switch 332b conduct during flyback, a voltage drop across the first auxiliary switch 332a and the second auxiliary switch 332b is a difference between $V_{node}$ and a voltage level of the input voltage provided by the AC voltage source 316. In some embodiments, the difference between $V_{node}$ and the voltage level of the neutral point 326 may be greater than the difference between $V_{node}$ and the voltage level of the input voltage. Accordingly, it may be advantageous to implement the smaller voltage drop across the first auxiliary switch 332a and the second auxiliary switch 332b such that voltage stress and switching losses are reduced, and efficiency is thereby increased.

As discussed above, the 3-level NPC converter 300 is controlled at least in part by the controller 314. In at least one embodiment, the controller 314 operates according to a control scheme referred to herein as a Flexible Carrier Cascade Disposition (FCCD) PWM control scheme. The FCCD PWM control scheme allows the 3-level NPC converter 300 to smoothly transition between the four modes of operation discussed above.

Figure 9:
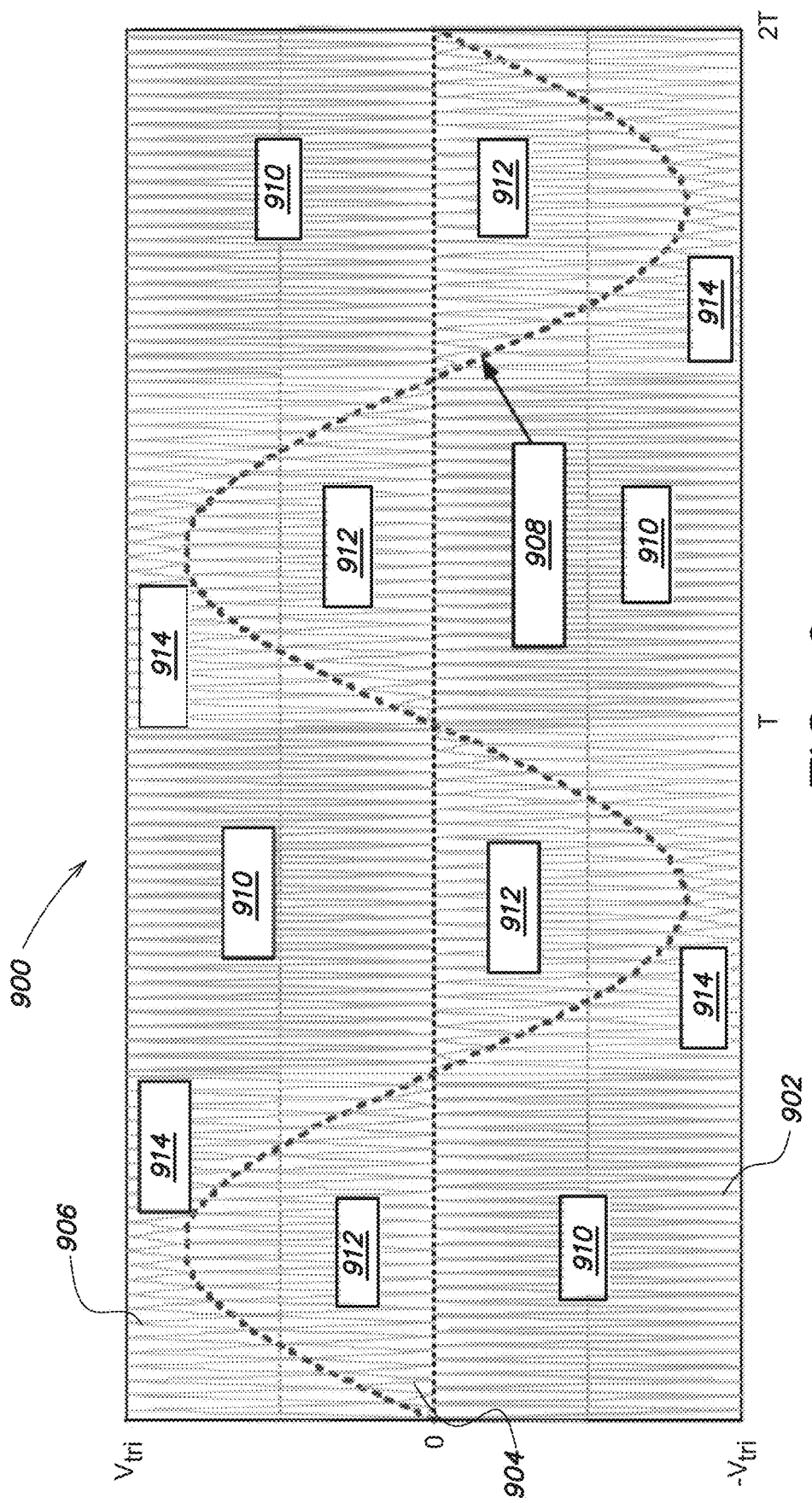
FIG. 9 is a graph of a control scheme executed by a controller according to an embodiment.

FIG. 9 illustrates a control scheme graph 900 according to an embodiment. The graph 900 includes a horizontal axis indicative of time, and a vertical axis indicative of a voltage level. The graph 900 includes a first modulation signal 902, a second modulation signal 904, a third modulation signal 906, and a boundary line 908. In some embodiments, the modulation signals 902-906 are triangular waveforms, and the boundary line 908 is a sinusoidal waveform indicative of an input voltage.

The first modulation signal 902 oscillates between the horizontal axis and a voltage $V_{tri}$ having a polarity opposite the polarity of the boundary line 908 in a first region 910. In the embodiment illustrated by FIG. 9, four instances of the first region 910 are present, each including the first modulation signal 902. The second modulation signal 904 oscillates between the horizontal axis and the boundary line 908 in a second region 912. In the embodiment illustrated by FIG. 9, four instances of the second region 912 are present, each including the second modulation signal 904.

The third modulation signal 906 oscillates between the boundary line 908 and the voltage $V_{tri}$ having a same polarity as the polarity of the boundary line 908 in a third region 914. In the embodiment illustrated by FIG. 9, four instances of the third region 914 are present, each including the third modulation signal 906.

In some embodiments, the graph 900 may be implemented to determine a mode of operation to be executed by the controller 314. For example, an output voltage waveform, such as an output voltage waveform provided to the load 338, may be compared to the graph 900 to determine if the output voltage waveform is in the first region 910, the second region 912, the third region 914, or is approximately equal to the boundary line 908. In some embodiments, the first region 910 corresponds to the stop mode, the second region 912 corresponds to the buck mode, the third region 914 corresponds to the freewheel mode, and the boundary line 908 corresponds to the connection mode.

The modulation signals 902-906 may be utilized to generate PWM signals provided by the controller 314 to one or more switches in the 3-level NPC converter 300 depending on a mode of operation. In some embodiments, for a given area, a corresponding modulation signal may be compared to an error signal. For example, in the first region 910, the first modulation signal 902 may be compared to an error signal indicative of an error between an output voltage and a reference output voltage indicative of a desired output voltage waveform.

The error signal may be generated by a controller, such as the controller 314 or another controller. The comparison may be executed by a comparator configured to output, based on the comparison between the error signal and the first modulation signal 902, PWM signals which are provided to one or more switches in the 3-level NPC converter 300 according to a mode of operation of the converter 300. For example, if an output waveform is in the first region 910, which may correspond to the stop mode, then the first modulation signal 902 may correspond to PWM signals provided to switches in the rectifier portion 304 and the inverter portion 308 to alternately open and close the switches.

Figure 10:
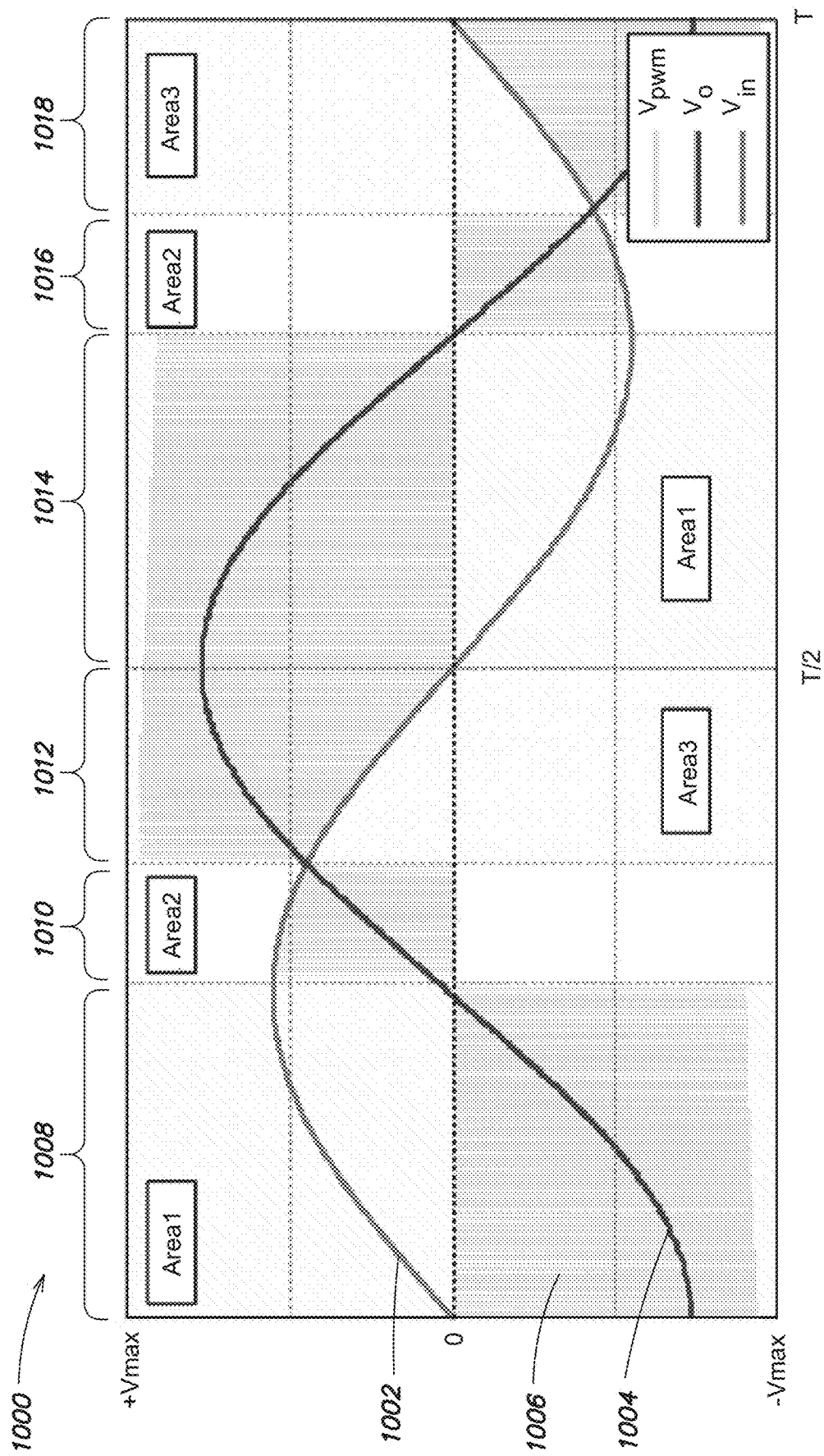
FIG. 10 is a graph of a control scheme executed by the controller according to an embodiment.

FIG. 10 illustrates an example graph 1000 according to an embodiment. The graph 1000 includes a horizontal axis indicative of time, and a vertical axis indicative of a voltage level ranging from a negative maximum voltage level $-V_{max}$ to a positive maximum voltage level $+V_{max}$. The graph 1000 includes an input voltage signal 1002, an output voltage signal 1004, and an intermediate voltage signal 1006. For purposes of explanation, the graph 1000 is divided into a first time period 1008, a second time period 1010, a third time period 1012, a fourth time period 1014, a fifth time period 1016, and a sixth time period 1018.

The graph 1000 provides an example of selecting a mode of operation according to an FCCD PWM control scheme. For example, the graph 1000 may illustrate an example of a control scheme executed by the controller 314 in connection with the 3-level NPC converter 300. The input voltage signal 1002 may correspond to an input voltage signal provided by the AC voltage power source 316, the output voltage signal 1004 may correspond to an output voltage signal provided to the load 338, and the intermediate voltage signal 1006 may correspond to a voltage level at an intermediate node 346.

The first time period 1008 generally corresponds to a time period during which the input voltage signal 1002 has a polarity opposite the polarity of the output voltage signal 1004. As illustrated by FIGS. 9 and 10, the output voltage signal 1004 may be considered to be in the first region 910 during the first time period 1008, which may correspond to the stop mode of operation. As illustrated by FIG. 10, the intermediate voltage signal 1006 during the first time period 1008 may oscillate between the voltage of the horizontal axis and the negative maximum voltage level $-V_{max}$ at varying widths to generate an output voltage similar to the output voltage signal.

The second time period 1010 generally corresponds to a time period during which the input voltage signal 1002 has the same polarity as the polarity of the output voltage signal 1004, and a magnitude greater than a magnitude of the output voltage signal 1004. As illustrated by FIGS. 9 and 10, the output voltage signal 1004 may be considered to be in the second region 912 during the second time period 1010, which may correspond to the buck mode of operation. The intermediate voltage signal 1006 during the second time period 1010 may oscillate between the horizontal axis and the voltage of the input voltage signal 1002 at varying widths to generate an output voltage similar to the output voltage signal.

Between the second time period 1010 and the third time period 1012, the input voltage signal 1002 may be considered to be approximately equal to the output voltage signal 1004. The input voltage signal 1002 may be considered to be equal to the output voltage signal 1004 when the input voltage signal 1002 is within a threshold range of the output voltage signal 1004. In some embodiments, the input voltage signal 1002 being approximately equal to the output voltage signal 1004 may correspond to the connection mode of operation.

The third time period 1012 generally corresponds to a time period during which the input voltage signal 1002 has the same polarity as the polarity of the output voltage signal 1004, and a magnitude less than a magnitude of the output voltage signal 1004. As illustrated by FIGS. 9 and 10, the output voltage signal 1004 may be considered to be in the third region 914 during the third time period 1012, which may correspond to the freewheel mode of operation.

As illustrated by FIG. 10, the intermediate voltage signal 1006 during the third time period 1012 may oscillate between the voltage of the input voltage signal 1002 and the positive maximum voltage level $+V_{max}$ at varying widths to generate an output voltage similar to the output voltage signal.

Similar to the first time period 1008, the fourth time period 1014 generally corresponds to a time period during which the input voltage signal 1002 has a polarity opposite the polarity of the output voltage signal 1004. However, the polarity of the input voltage signal 1002 during the fourth time period 1014 is opposite the polarity of the input voltage signal 1002 during the first time period 1008, and the polarity of the output voltage signal 1004 during the fourth time period 1014 is opposite the polarity of the output voltage signal 1004 during the first time period 1008.

As illustrated by FIGS. 9 and 10, the output voltage signal 1004 may be considered to be in the first region 910 during the fourth time period 1014, which may correspond to the stop mode of operation. As illustrated by FIG. 10, the PWM signal 1006 during the fourth time period 1014 may oscillate between the horizontal axis and the positive maximum voltage level $+V_{max}$ at varying widths to generate an output voltage similar to the output voltage signal.

Similar to the second time period 1010, the fifth time period 1016 generally corresponds to a time period during which the polarity of the input voltage signal 1002 is the same as the polarity of the output voltage signal 1004, and the magnitude of the input voltage signal 1002 is greater than the magnitude of the output voltage signal 1004. However, the polarity of the input voltage signal 1002 and the output voltage signal 1004 during the fifth time period 1016 is opposite the polarity of the input voltage signal 1002 and the output voltage signal 1004 during the second time period 1010.

As illustrated by FIGS. 9 and 10, the output voltage signal 1004 may be considered to be in the second region 912 during the fifth time period 1016, which may correspond to the buck mode of operation. As illustrated by FIG. 10, the PWM signal 1006 during the fifth time period 1016 may oscillate between the horizontal axis and the voltage of the input voltage signal 1002 at varying widths to generate an output voltage similar to the output voltage signal.

Between the fifth time period 1016 and the sixth time period 1018, the input voltage signal 1002 may be considered to be approximately equal to the output voltage signal 1004. Similar to the time between the second time period 1010 and the third time period 1012, the input voltage signal 1002 being approximately equal to the output voltage signal 1004 may correspond to the connection mode of operation. Accordingly, the PWM signal 1006 between the fifth period of time 1016 and the sixth period of time 1018 may represent one or more PWM control signals communicated by the controller 314 to one or more switches in at least one of the rectifier portion 304, the inverter portion 308, and the auxiliary portion 310 as discussed above with respect to FIG. 6.

Similar to the third time period 1012, the sixth time period 1018 generally corresponds to a time period during which the polarity of the input voltage signal 1002 is the same as the polarity of the output voltage signal 1004, and the magnitude of the input voltage signal 1002 is less than the magnitude of the output voltage signal 1004. However, the polarity of the input voltage signal 1002 and the output voltage signal 1004 during the sixth time period 1018 is opposite the polarity of the input voltage signal 1002 and the output voltage signal 1004 during the third time period 1012.

As illustrated by FIGS. 9 and 10, the output voltage signal 1004 may be considered to be in the third region 914 during the sixth time period 1018, which may correspond to the freewheel mode of operation. As illustrated by FIG. 10, the PWM signal 1006 during the sixth time period 1018 may oscillate between the voltage of the input voltage level 1002 and the negative maximum voltage level $-V_{max}$ at varying widths to generate an output voltage similar to the output voltage signal.

Accordingly, the 3-level NPC converter 300 enables switching losses to be minimized at least in part by providing the auxiliary branch portion 310. Minimizing switching losses allows converter efficiency to be enhanced, which yields reductions in costs and potentially-disadvantageous thermal emissions. Operation of the 3-level NPC converter 300 is controlled at least in part by the controller 314 according to the FCCD PWM control scheme, which enables smooth transitions between the various modes of operation discussed above.

The controller 314 may monitor and control operation of the 3-level NPC converter 300. Using data stored in associated memory, the controller 314 also executes one or more instructions stored on one or more non-transitory computer-readable media that may result in manipulated data. In some examples, the controller 314 may include one or more processors or other types of controllers. In one example, the controller 314 is a commercially available, general purpose processor. In another example, the controller 314 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. An Uninterruptible Power Supply (UPS) system, the system comprising:
   an input configured to receive AC input power;
   an output configured to provide AC output power to at least one load, the output having an output inductor;
   a rectifier coupled to the input, the rectifier including one or more rectification switches;
   an inverter coupled to the rectifier at a first connection and coupled to the output at a second connection, the inverter including one or more main branch switches and one or more freewheeling switches;
   an auxiliary branch coupled to the input at a first connection and coupled to the output at a second connection, the auxiliary branch including one or more auxiliary switches; and
   a controller coupled to the rectifier, the inverter, and the auxiliary branch, and configured to:
   receive input voltage information indicative of a voltage level of the AC input power;
   receive output voltage information indicative of a voltage level of the AC output power;
   select, based on the input voltage information and the output voltage information satisfying a first condition, a buck mode of operation;
   select, based on the input voltage information and the output voltage information satisfying a second condition, a freewheel mode of operation, wherein satisfying the second condition includes determining that the voltage level of the AC input power is less than the voltage level of the AC output power;
   operate the one or more main branch switches to generate the AC output power and provide the AC output power to the output responsive to the second condition being satisfied; and
   operate the one or more auxiliary switches to freewheel during flyback of the output inductor responsive to the second condition being satisfied.

2. The UPS system of claim 1, wherein satisfying the first condition includes determining that the voltage level of the AC input power is greater than the voltage level of the AC output power.

3. The UPS system of claim 1, wherein the controller is configured, responsive to the first condition being satisfied, to:
   operate the one or more auxiliary switches to conduct the AC input power to at least one of the output and the inverter; and
   operate the one or more freewheeling switches to buck the AC input power.

4. The UPS system of claim 1, wherein the controller is further configured to select, based on the input voltage information and the output voltage information, one of a connection mode of operation and a stop mode of operation.

5. The UPS system of claim 4, wherein the controller is configured to select the connection mode of operation responsive to determining that the voltage level of the AC input power is approximately equal to the voltage level of the AC output power.

6. The UPS system of claim 5, wherein the controller is configured to determine that the voltage level of the AC input power is approximately equal to the voltage level of the AC output power responsive to determining that the voltage level of the AC input power is within a threshold range of the voltage level of the AC output power.

7. The UPS system of claim 4, wherein the controller is configured, responsive to selecting the connection mode of operation, to:
   disable the rectifier and the inverter from providing power; and
   operate the one or more auxiliary switches to provide the AC input power to the output.

8. The UPS system of claim 4, wherein the controller is configured to select the stop mode of operation responsive to determining that a polarity of the voltage level of the AC input power is opposite a polarity of the voltage level of the AC output power.

9. The UPS system of claim 4, wherein the controller is configured, responsive to selecting the stop mode of operation, to:
   disable the one or more auxiliary switches from providing the AC input power to the output; and operate the one or more rectification switches, the one or more main branch switches, and the one or more freewheeling switches to provide the AC output power to the output.

10. A method of conditioning AC input power received from an input with one or more of a rectifier including one or more rectification switches, an inverter having one or more main branch switches and one or more freewheeling switches, and an auxiliary branch having one or more auxiliary switches, to provide AC output power to an output having an output inductor, the method comprising:
receiving input voltage information indicative of a voltage level of the AC input power;
receiving output voltage information indicative of a voltage level of the AC output power;
selecting, based on a determination that the input voltage information and the output voltage information satisfy a first condition at a first time, a buck mode of operation;
selecting, based on a determination that the input voltage information and the output voltage information satisfy a second condition at a second time, a freewheel mode of operation, wherein satisfying the second condition includes determining that the voltage level of the AC input power is less than the voltage level of the AC output power;
operating the one or more main branch switches to generate the AC output power and provide the AC output power to the output responsive to the second condition being satisfied; and
operating the one or more auxiliary switches to freewheel during flyback of the output inductor responsive to the second condition being satisfied.

11. The method of claim 10, wherein determining that the input voltage information and the output voltage information satisfy the first condition includes determining that the voltage level of the AC input power is greater than the voltage level of the AC output power.

12. The method of claim 10, further comprising:
operating, responsive to selecting the buck mode of operation, the auxiliary branch to conduct the AC input power to at least one of the output and the inverter; and
operating, responsive to selecting the buck mode of operation, the inverter to buck the AC input power.

13. The method of claim 10, further comprising selecting, based on the input voltage information and the output voltage information, one of a connection mode of operation and a stop mode of operation.

14. The method of claim 13, further comprising
selecting, responsive to determining that the voltage level of the AC input power is equal to the voltage level of the AC output power, the connection mode of operation.

15. An Uninterruptible Power Supply (UPS) system, the system comprising:
an input configured to receive AC input power;
an output configured to provide AC output power to at least one load;
a rectifier coupled to the input, the rectifier having one or more rectification switches;
an inverter coupled to the rectifier at a first connection and coupled to the output at a second connection, the inverter having one or more main branch switches and one or more freewheeling switches;
an auxiliary branch coupled to the input at a first connection and coupled to the output at a second connection, the auxiliary branch having one or more auxiliary switches; and
a controller coupled to the rectifier, the inverter, and the auxiliary branch, and configured to:
receive input voltage information indicative of a voltage level of the AC input power;
receive output voltage information indicative of a voltage level of the AC output power;
select, based on the input voltage information and the output voltage information satisfying a first condition, a buck mode of operation;
select, based on the input voltage information and the output voltage information satisfying a second condition, a freewheel mode of operation;
select a stop mode of operation responsive to determining that a polarity of the voltage level of the AC input power is opposite a polarity of the voltage level of the AC output power; and
communicate one or more control signals to at least one of the rectifier, the inverter, and the auxiliary branch based on the selected mode of operation.

16. The UPS system of claim 15, wherein the controller is configured, responsive to selecting the stop mode of operation, to:
disable the one or more auxiliary switches from providing the AC input power to the output; and
operate the one or more rectification switches, the one or more main branch switches, and the one or more freewheeling switches to provide the AC output power to the output.

17. The UPS system of claim 15, wherein satisfying the first condition includes determining that the voltage level of the AC input power is greater than the voltage level of the AC output power.

18. The UPS system of claim 17, wherein the controller is configured, responsive to the first condition being satisfied, to:
operate the one or more auxiliary switches to conduct the AC input power to at least one of the output and the inverter; and
operate the one or more freewheeling switches to buck the AC input power.

19. The UPS system of claim 15, wherein the controller is further configured, responsive to determining that the voltage level of the AC input power is approximately equal to the voltage level of the AC output power, to:
disable the rectifier and the inverter from providing power; and
operate the one or more auxiliary switches to provide the AC input power to the output.

20. The method of claim 13, further comprising selecting, responsive to determining that a polarity of the voltage level of the AC input power is opposite a polarity of the voltage level of the AC output power, the stop mode of operation.

* * * * *